United States Patent [19]

Paul et al.

[11] Patent Number: 5,042,441

[45] Date of Patent: Aug. 27, 1991

[54] LOW EMISSION COMBUSTION SYSTEM FOR INTERNAL COMBUSTION ENGINES

[76] Inventors: Marius A. Paul; Ana Paul, both of 1100 E. Orangethorpe Ave., Ste. 140, Anaheim, Calif. 92801

[21] Appl. No.: 416,396

[22] Filed: Oct. 3, 1989

[51] Int. Cl.$^5$ .............................................. F02F 3/26
[52] U.S. Cl. ...................... 123/276; 123/257; 123/261; 123/279; 123/299; 123/51 BA; 239/533.3
[58] Field of Search ............ 123/257, 261, 263, 273, 123/276, 279, 286, 299, 300, 307, 305, 51 BA; 239/533.3, 533.4, 533.5, 533.12

[56] References Cited

U.S. PATENT DOCUMENTS

| | | | |
|---|---|---|---|
| 811,744 | 2/1906 | Reichenbach | 123/275 |
| 1,691,172 | 11/1928 | Winckler | 123/275 |
| 1,816,432 | 7/1931 | Hill | 123/262 |
| 1,818,339 | 8/1931 | Lang | 123/279 |
| 2,236,950 | 4/1941 | Ricardo | 123/257 |
| 2,256,776 | 9/1941 | Kammer | 123/274 |
| 2,570,616 | 10/1951 | Welsh | 123/299 |
| 2,655,906 | 10/1953 | Udale | 123/257 |
| 2,658,487 | 11/1953 | Basabe | 123/275 |
| 2,840,059 | 6/1958 | Buchi | 123/262 |
| 3,391,680 | 7/1968 | Benson | 123/299 |
| 3,424,137 | 1/1969 | Guertler | 123/279 |
| 3,923,032 | 12/1975 | Studenroth | 123/279 |
| 4,339,080 | 7/1982 | Kopse | 239/533.3 |
| 4,543,930 | 10/1985 | Baker | 123/299 |
| 4,758,169 | 7/1988 | Steiger | 239/533.5 |
| 4,791,787 | 12/1988 | Paul et al. | 60/605 |
| 4,809,646 | 3/1989 | Paul et al. | 123/51 |

FOREIGN PATENT DOCUMENTS

| | | | |
|---|---|---|---|
| 31440 | 3/1923 | Denmark | 123/307 |
| 50349 | 3/1940 | France | 123/279 |
| 625948 | 7/1949 | United Kingdom | 123/261 |

Primary Examiner—Noah P. Kamen
Attorney, Agent, or Firm—Bielen, Peterson & Lampe

[57] ABSTRACT

A combustion system for internal combustion engines having a cylinder, at least one piston reciprocal in the cylinder and a combustion chamber with three regions for improving the combustion process, the piston having a piston head with an outer perimeter portion, a central recessed portion and a baffle with ports arranged over the recessed portion, the piston cooperating with a cylinder head or the head of an opposed piston to form an induction region that diminishes in volume as the piston approaches top dead center forcing gases in the combustion chamber through a central region defined primarily by the ports in the baffle to the dispersing region in the recessed portion of the piston, and a fuel injection system with an injector that delivers a staged series of fuel pulses in each cycle.

20 Claims, 5 Drawing Sheets

LOW EMISSION COMBUSTION SYSTEM FOR INTERNAL COMBUSTION ENGINES

BACKGROUND OF THE INVENTION

This invention relates to a combustion system for an internal combustion engine, particularly a fuel injected engine in which the period for mixing the fuel with air is extremely short inhibiting complete mixture and full combustion.

In the present state of the art of internal combustion engines, spark ignited engines and compression ignited engines are at opposite poles of thermal cycles when it comes to mixing the air and fuel and combusting the air-fuel mixture. In a conventional spark ignited engine, air and fuel are well mixed during aspiration or compression of the fuel air charge. Coupled with the higher volatility of gasoline in comparison with diesel fuel primarily used in compression ignited engines, relatively complete mixture and uniform combustion can be accomplished in gasoline engines. Difficulties arise in spark ignited engines where fuel injectors are timed to inject fuel during the final period of the compression stroke. In such situation the fuel injected gasoline engine may perform in a similar manner to conventional diesel engines with less than complete combustion.

In the conventional compression ignited engine, particularly the customary diesel engine, the fuel and air mixture is internally formed during the very last stages of compression. Because the fuel is directly injected as a liquid into the hot compressed air, incomplete combustion is inevitable with internal zones of low temperature, forming discharge of particulate carbon, and local zones of extremely high temperature, forming oxides of nitrogen.

Since conventional gasoline and diesel fuel engines are the predominant means of propelling vehicles of transportation, the engines are required to be operated under an extraordinarily wide range of conditions. Because of the inefficiencies of the mixture and ignition cycle and the required variable operating conditions, modern engines continue to be the major source of air pollution. Although the specific reasons for pollutant emissions in all of these engines are well known by those who are professionally skilled, and, although intensive research is being conducted throughout the world to solve or at least to diminish this major source of pollution, the problem of vehicle exhaust pollution remains. State of the art attempts at solving the problem act primarily outside of the combustion chamber using catalytic converters, particulate traps, after-combustors and other methods that act on the exhaust stream and not on the source of the problem, the combustion process. The combustion system of this invention is designed to resolve the problem of excessive air pollution by a fundamental change in the manner in which fuel is combusted in the combustion chamber.

SUMMARY OF THE INVENTION

The combustion system of this invention is designed to avoid generation of pollution during the combustion process creating at the origin the appropriate conditions for clean combustion and a non-polluting and smokeless exhaust. The system includes the necessary components to effect the process in the following steps; production and injection into the combustion chamber of a homogeneous mixture of fuel and air; division and dispersion of the homogeneous mixture into multiple impulses successively injected into the combustion chamber; ignition, combustion and dissipation of each impulse successively avoiding "hot islands" or local zones of high heat generation; finally, complete combustion in a volume with lean and very lean air/fuel ratios, such that low peak temperatures are maintained uniformly throughout the combustion chamber. All of these features of the unique combustion system must be associated with a maximum supply of air to the cylinder or cylinders. Furthermore, the air intake temperature is preferred to be at its lowest to improve the density of the precompressed air. A preferred system for delivering high pressure air to the cylinder is described in our application entitled "OPTIMIZED HIGH PRESSURE INTERNAL COMBUSTION ENGINES", Ser. No: 341,533, Filed: 21 April 1989 and in our U.S. Pat. No. 4,791,787 entitled "REGENERATIVE THERMAL ENGINE".

The primary novel features of this invention relate to; a novel configuration for combustion chambers; a high pressure, high energy, fuel-injection system actuated with an ultrasonic wave generator; a sequential, electronically controlled process for regulating injection timing, mixture composition, evaluation of combustion pressure, air fuel ratio, and exhaust composition.

In the combustion system of this invention, the combustion chamber is divided into three primary zones or regions. The first region is an air induction chamber created by the configuration of the piston and cylinder head. In the preferred embodiment the induction chamber is formed by the configuration of opposed piston heads such that the air volume compressed by the piston at the end of the compression stroke is forced by a squish action to radially move from the perimeter of the cylinder to a central region. The second region is a dispersing chamber into which the fuel is injected in a highly atomized, multiple divided impulse process. The injected fuel is carried by the high velocity, centrally directed air flow into the dispersing chamber for thorough mixing and primary combustion. Between the air induction chamber and the dispersing chamber is a mixing zone with a port baffle having a specially configured arrangement of passages for violently mixing the fuel with the air to provide a homogenized introduction of a fuel air mixture into the dispersing chamber. The port baffle can be fabricated of a special composition to withstand high temperatures and retain heat to enhance the volatilization of the fuel as it is combusted.

Especially designed injectors are utilized to create a multiple stage injection process to inject fuel under high pressure in a series of impulses of small quantities of fuel that are highly atomized by an associated ultrasonic driver. An electronic control center regulates the injection process and optimizes the operation of the combustion process using sensors to detect load, rotation, air intake, exhaust composition and other operating factors to program the timing of injection, duration of injection and operation of the ultrasonic generator and the staging of the injector system. The primary function of the combustion system is to enable a charge of thoroughly mixed fuel and compressed air to be delivered to a pre-combustion chamber for combustion without substantial variations in the temperature of combustion which would result in either pockets of high temperature gases that would result in nitrogen fixation or low temperature gases that would incompletely burn the fuel and generate particulate matter.

The design of the combustion system is primarily adapted for diesel engines where fuel of lesser volatility than gasoline is injected at the final stage of combustion and is inadequately mixed for efficient combustion. However, the combustion system can be adapted for spark ignited engines, particularly those engines that are operated with extremely lean mixtures and at high r.p.m. resulting in an inadequate time for complete mixture and combustion of the fuel. In spark ignited engines the new system opens a wide field of lean mixture combustion having a high thermal efficiency and a low specific fuel consumption and with total elimination of pollution without the use of a catalytic converter.

DETAILED DESCRIPTION OF THE PREFERRED EMBODIMENTS

Figure 1:
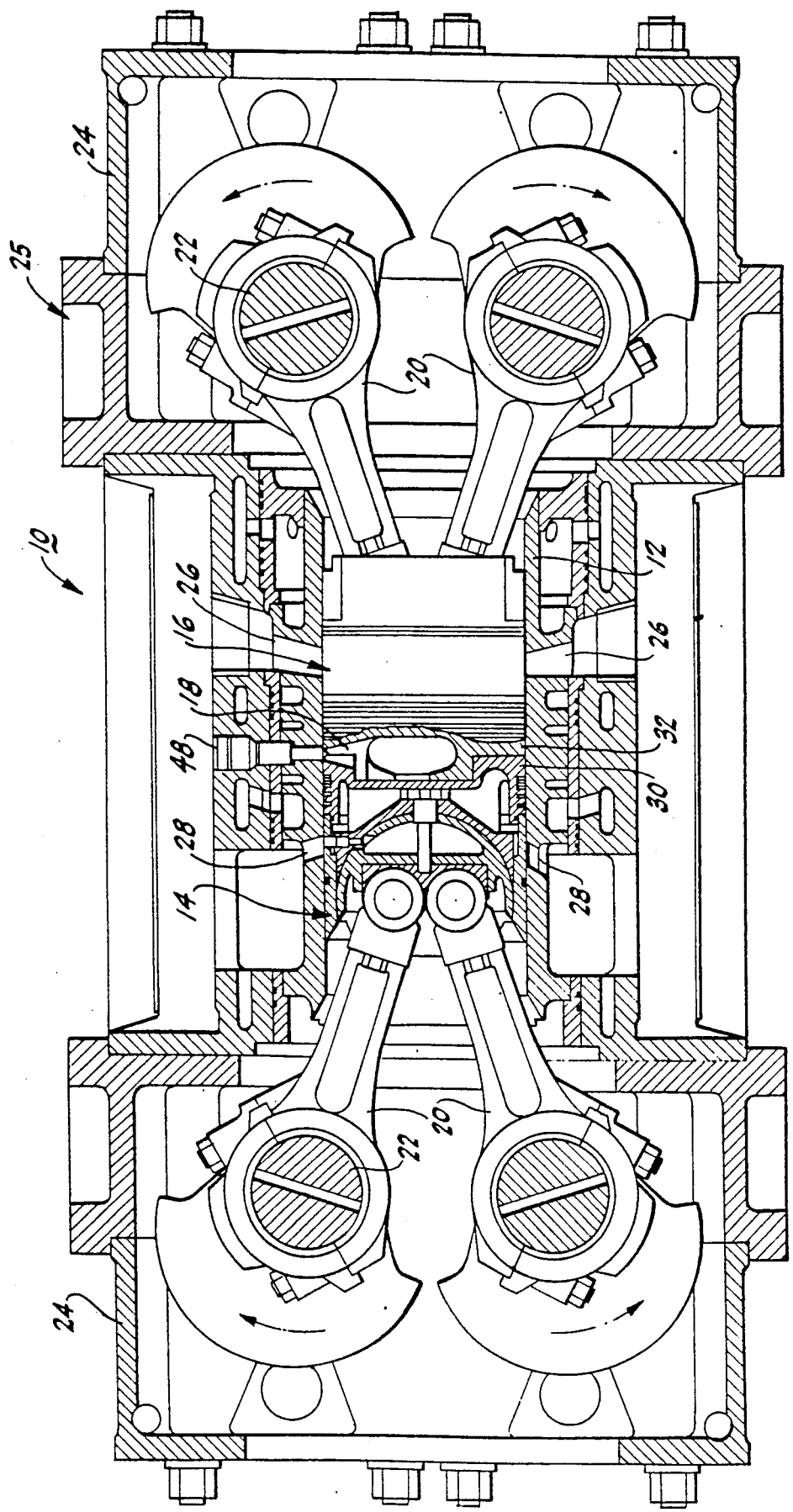
FIG. 1 is a cross sectional, side elevation view of an opposed piston engine utilizing the combustion system of this invention.

Referring to the drawings, FIG. 1 shows an opposed piston engine, designated generally by the reference numeral 10, in which the combustion system is incorporated. The opposed piston engine 10 has a central single cylinder 12 with opposed pistons 14 and 16 forming a combustion chamber 18 therebetween. Each piston is connected to a pair of connecting rods 20 which are in turn connected to oppositely rotating crank shafts 22 supported in a crank case 24 which forms part of the engine housing 26. During reciprocation of the pistons 14 and 16, exhaust ports 26 and intake ports 28 are exposed for the induction of a charge of air into the cylinder and for exhaust of combusted gases from the cylinder. The special configuration of the combustion chamber 18 is formed by the specially designed, complimentary piston heads 30 and 32.

Figure 4:
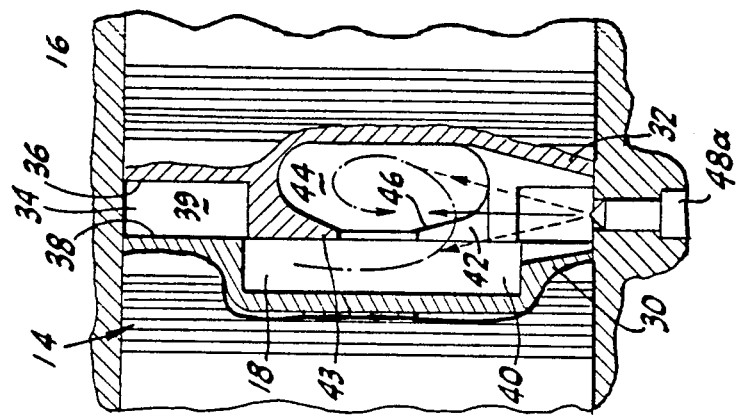
FIG. 4 is a partial, cross sectional view taken on the lines B-B of the engine in the FIG. 1 with the opposed pistons approaching the top dead center position.
Figure 3:
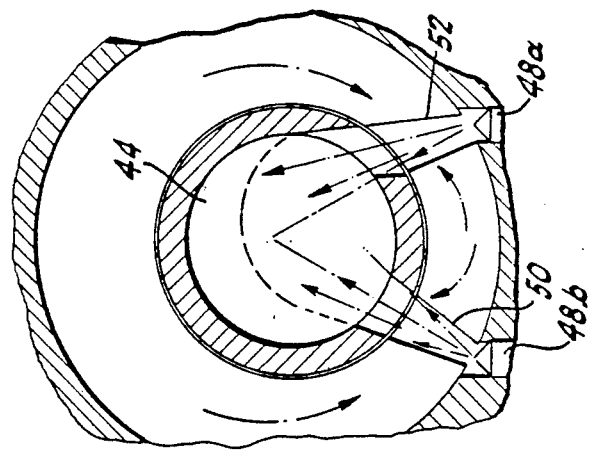
FIG. 3 is a cross sectional view taken on the lines A-A in FIG. 2.
Figure 2:
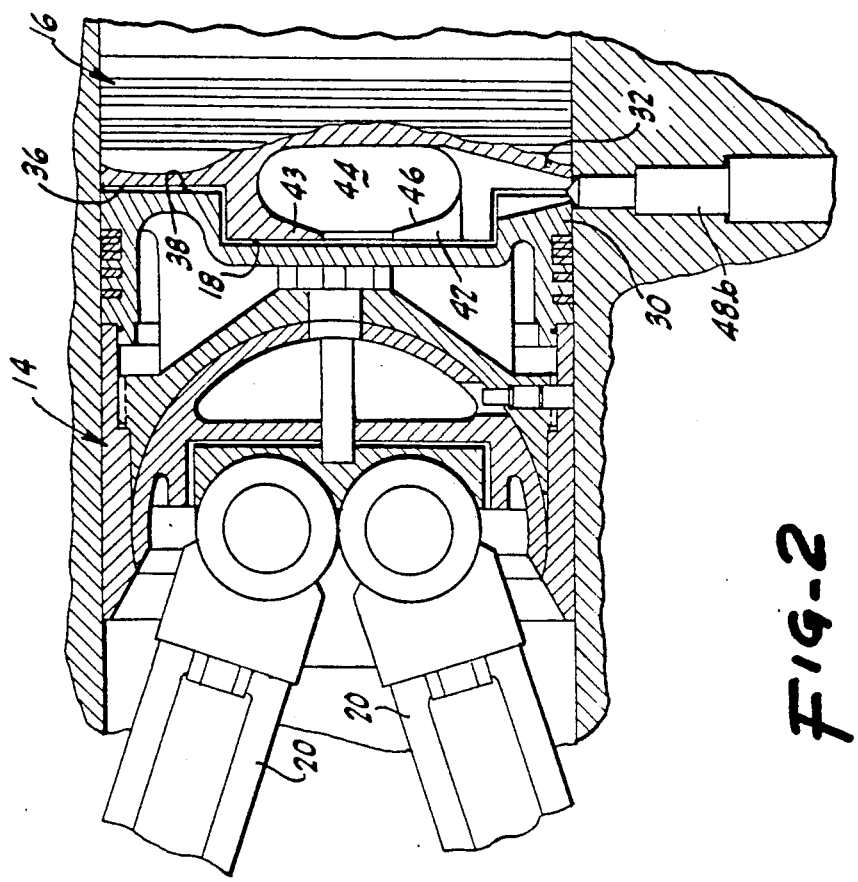
FIG. 2 is a partial, cross sectional view of a portion of an engine detailing the combustion chamber at top dead center of the pistons.

A design of the piston heads 30 and 32 is shown in greater detail in FIGS. 2 to 4. In FIG. 2 the piston heads 30 and 32 are shown at their top dead center position such that the volume of the effective combustion chamber 18 is minimized. In FIG. 4, the effective combustion chamber 18 is shown for the engine with the pistons approaching top dead center. It is at this position that the fuel injection process commences to insure a homogeneous mixture and a complete and full combustion.

The combustion chamber 18 has three zones or regions to effect thorough mixing of the fuel and air. An outer peripheral zone or region 34 is formed by an annular recess 36 in the piston head 32 of one of the pistons and an annular raised rim 38 in the other piston head 30. The outer peripheral zone 34 forms a induction chamber 39 in which high pressure compressed air is radially forced into an intermediate zone or region 40 where the air mixes with fuel and passes through a plurality of specially configured convergent radial slots 42 in a baffle 43 to a dispersing chamber 44 where the primary combustion process occurs. The slots 42 are arranged in a pattern that enables the baffle to perform as a nozzle to disperse injected fuel and high velocity air, resulting from the squish action, into the dispersing chamber 44. Preferably, the ports are configured with a sloping face 46 to generate a swirl as the admixed fuel and air enter the dispersing chamber. A plurality of injection nozzles 48 are arranged around the perimeter of the cylinder 12 as shown in the alternate configurations of FIG. 1 and FIG. 3. At least two injection nozzles 48a and 48b are preferred in order to enable variation of the injected fuel quantity and to provide for a colliding spray pattern that generates a turbulent swirl as the fuel is injected into the intermediate zone 40 and the dispersing chamber 44 through passages 50 and 52. As shown in FIG. 3, the passage 50 comprises a divergent window that is radially oriented to inject the spray toward the center of the dispersing chamber 44. The passage 52 is arranged to direct the spray tangentially into the circular dispersing chamber to create a swirl action that collides with the radial spray to fully mix the fuel with the air as the mixture enters through the slots 42 into the dispersing chamber 41. The divergent windows formed by the passages 50 and 52 permit the spray of fuel to simultaneously penetrate all three regions as the pistons approach top dead center to provide an action similar to aspirated engines. Such action in the invented engine, however, occurs in only the final phase of compression.

As shown in FIG. 4, when the piston 16 approaches the top dead center, the tangentially positioned fuel injector 48a begins injecting fuel into the dispersing chamber 44 and in part into the outer peripheral zone 34 and intermediate zone 40. As the piston advances to top dead center the annular chamber 34 forming the outer peripheral zone abruptly diminishes in volume forcing the trapped air by squish action to be transported into the intermediate zone 40 and through the nozzle slots 42 of the specially configured baffle 43, mixing with the injected fuel as it is turbulently forced into the dispersing chamber 44. In a delay of approximately 5 to 7 degrees of the piston cycle the second radially positioned injector 48 is activated to direct a high pressure atomized jet of fuel through the passage 50 primarily to the intermediate zone 40 and dispersing chamber 44. The squish action developed by the pistons as they approach one another to the position as shown in FIG. 2 generate a vigorous mixing of air and fuel into a homogeneous mixture as the mixture enters the dispersing chamber for final mixing and complete combustion. Because the structure of the baffle 43 in which the ports 42 are formed is designed to withstand high temperature combustion, some of the retained thermal energy in the baffle is dissipated into the fuel-air mixture to enhance the volatilization of the fuel for efficient combustion.

Figure 6:
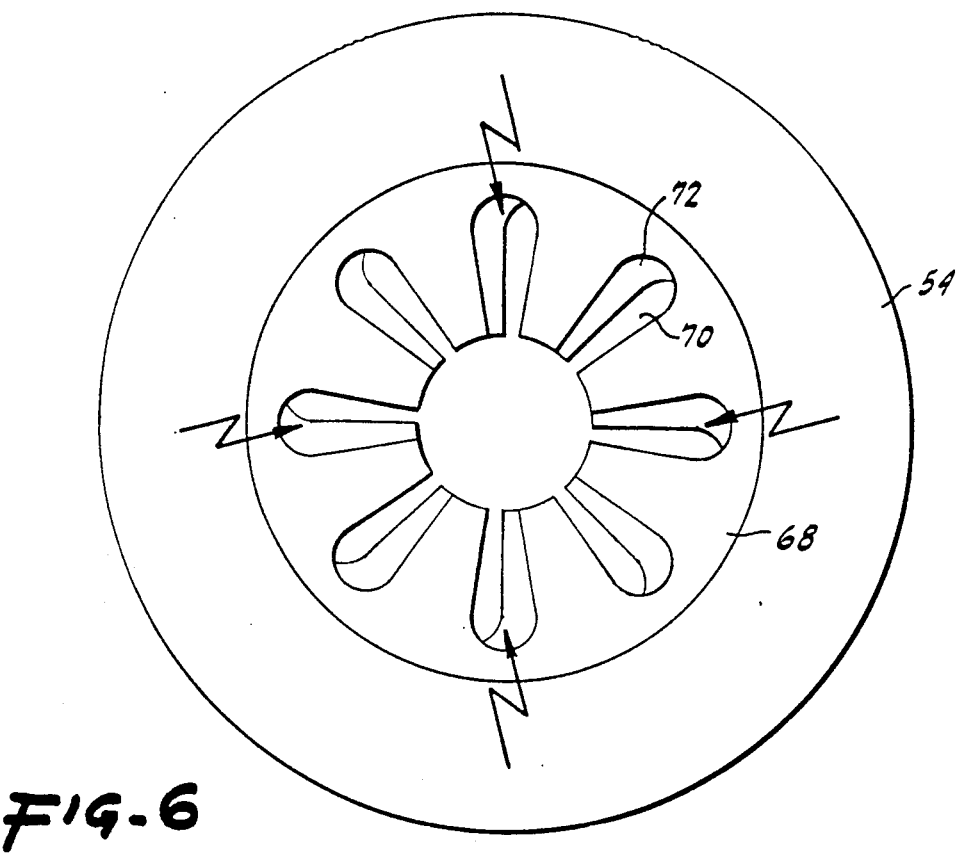
FIG. 6 is a top plan view of a slotted baffle having a passage configuration preferred for use in all embodiments of the combustion
Figure 5:
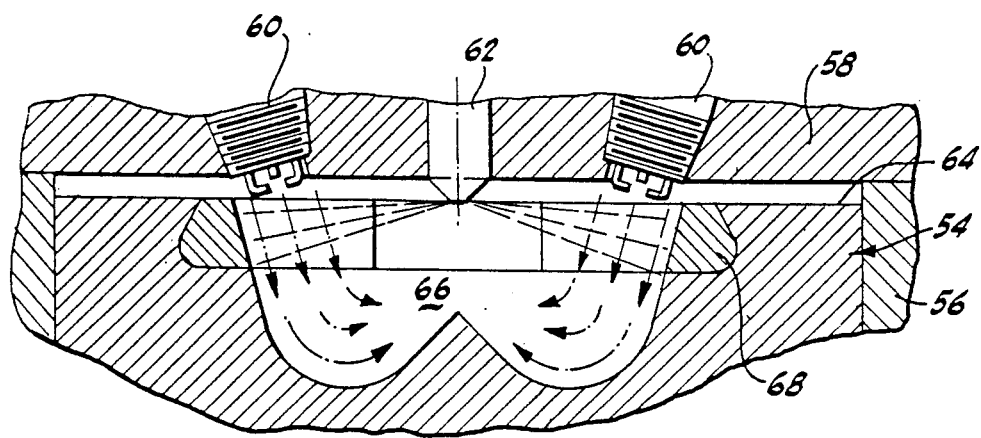
FIG. 5 is a partial, cross sectional view of a combustion chamber showing a piston and cylinder head configuration for a spark ignited engine.

As shown in FIGS. 5 and 6 the combustion system can be incorporated into a spark-ignited, fuel-injected engine. In FIG. 5 a piston 54 is reciprocated in a cylinder 56 with a cylinder head 58 supporting the mounting of a plurality of spark plugs 60 and central fuel injector nozzle 62. The piston 54 has a perimeter head portion 64 that approaches the cylinder head 58 when the piston reaches its top dead center. The close proximity of the head perimeter portion 64 of the piston 54 and cylinder head 58 causes a squish action of compressed air forcing the air radially toward the center of the cylinder. A recessed precombustion chamber 66 includes a baffle 68 with a series of slots 70 as shown in FIG. 6. The slots 70 have an incline face 72 to direct the high velocity air in a swirl as it enters the precombustion chamber 66. The fuel injection nozzle 62 is designed to direct a fan shaped spray that intersects the flow of compressed air through the baffle slots to provide a thorough premix of the fuel with the air as it enters the precombustion chamber. Key to the mixing process is the slotted baffle which may comprise a special composition inset of refractory steel such as the inset 76 in the piston head of the piston in FIG. 5. Alternately, the baffle may be integral with the material that is used to fabricate the piston head as shown in the opposed piston engine of FIG. 2.

In operation, the piston 54 rises to top dead center and squishes the air against the cylinder head 58 forcing a rapid flow of air inwardly toward the center of the cylinder. The fine particle fuel spray from the fuel injector nozzle 62 mixes with the incoming air and is ignited by the multiple spark plugs 60 as the air and fuel mix enter the precombustion chamber 66. In the preferred embodiment four spark plugs 60 are located uniformly around the piston head to provide 4 points of sparkling as schematically shown in FIG. 6.

Figure 7:
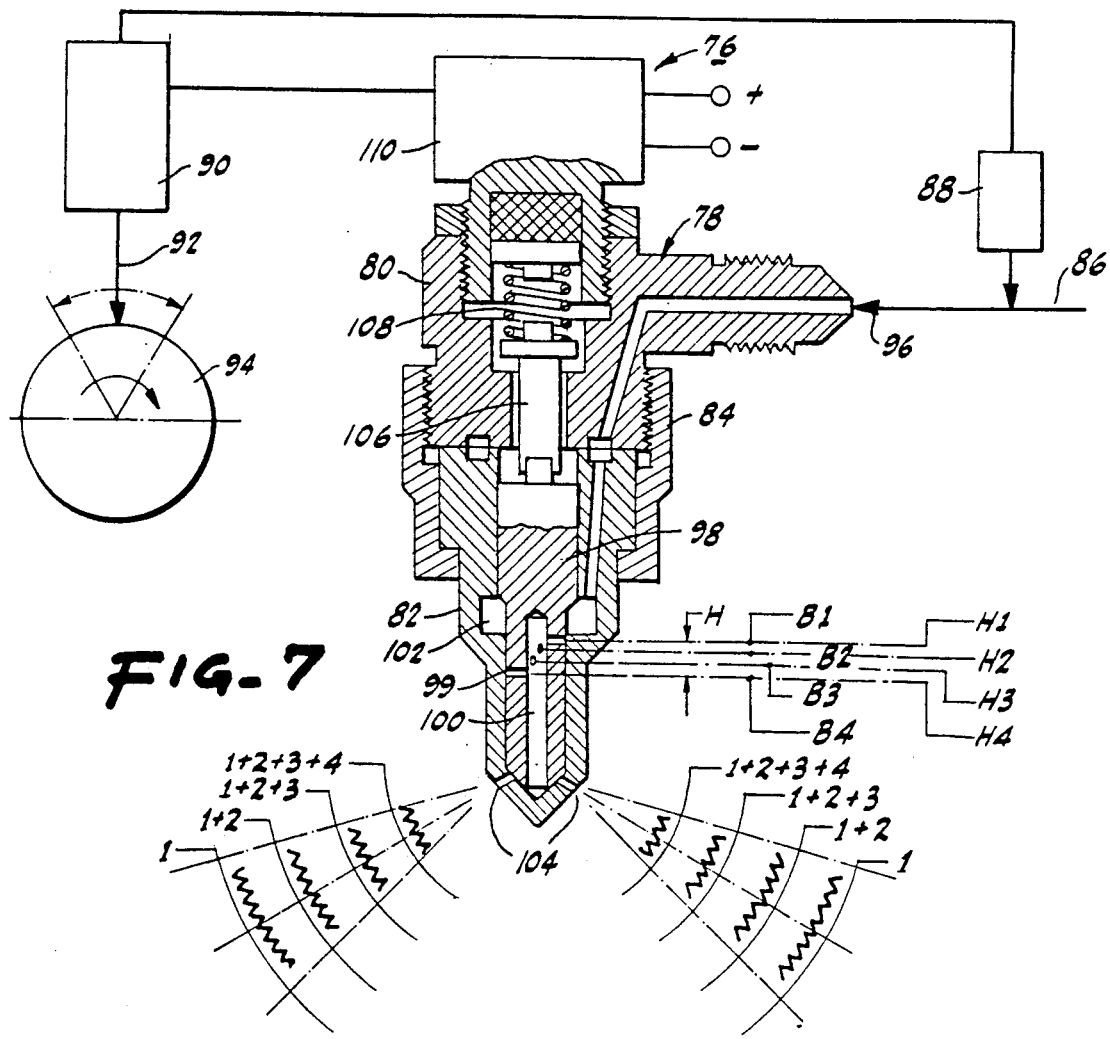
FIG. 7 is a cross sectional view of a first embodiment of a fuel injector with a schematic of the support system for the injector.
Figure 8:
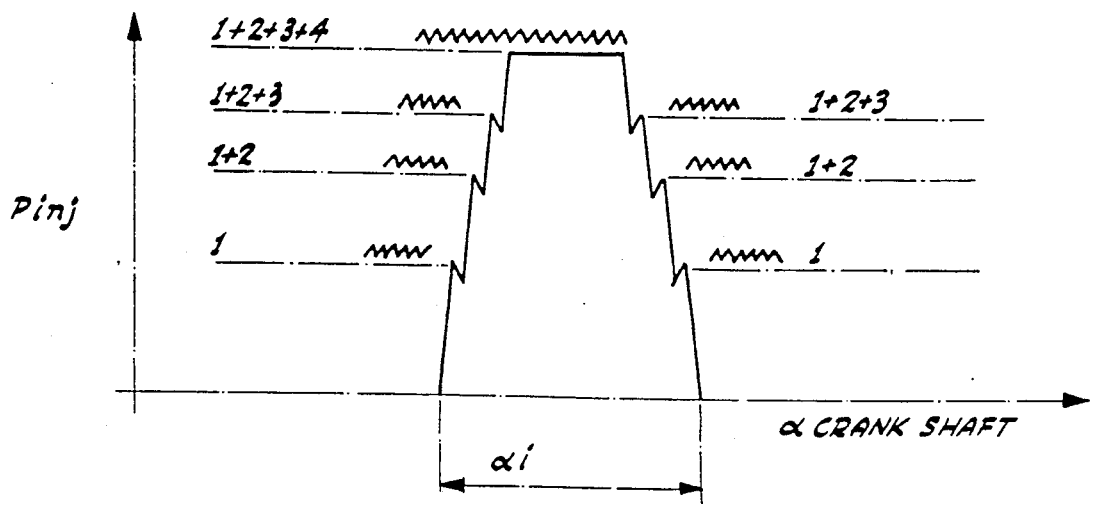
FIG. 8 is a diagrammatic view of the fuel injection process for the fuel injector of FIG. 7.

In order to improve the dispersing of the injected liquid fuel, specially designed fuel injectors are preferred. Referring to FIG. 7, a fuel injector that is designed to deliver a pulsed fuel supply is shown. In FIG. 8 the point in the engine cycle that each pulse of injected fuel is effected is shown in FIG. 8.

Referring to FIG. 7 an injection system 76 is shown with an injector assembly 78 having a body 80 and a tip structure 82 that is interconnected with the body 80 by a threaded collar 84. The injector 6 is connected to a high pressure fuel supply 86 regulated by an electronic control valve 88 controlled by an electronic microprocessor 90 which includes sensors, for example an electronic timing sensor 92 that senses the position of the crank shaft 94. It is to be understood that other engine operating conditions are sensed by the microprocessor 90 for controlling the quantity and timing of fuel that is supplied to the injector through fuel line 96 as is common in advanced state-of-the-art engines. An internal needle valve 98 has a plurality of staged orifices 99 to connect a central channel 100 to an annular reservoir 102 that is supplied fuel from the fuel line 96. As each of the staged orifices communicates with the reservoir 102 on retraction of the needle valve, fuel is forced through the central channel 100 and out the discharge orifices 104 in a series of pulses. Displacement of the needle 98 is restrained by a pusher 106 and spring 108 which will close the valve when the pressure in the reservoir 102 is lowered as a result of the closing of fuel supply line 96 by electronic valve 88. To produce a finely divided spray, an ultrasonic generator 110 transmits a high frequency ultrasonic pulse to the needle valve to produce a fine division to the fuel spray as it is emitted from the discharge orifices 104.

Referring to FIG. 8 a schematic diagram is shown to indicate the staged evolution of the injection pressure, when the stroke of the needle valve 98 successively exposes the orifices B1, B2, B3, and B4, and inversely closes the same orifices step by step. As the orifices are exposed at the levels H1, H2, H3, H4 along the stroke of the needle, the injected fuel is cumulatively ejected in sequential pulses as shown in the diagram of FIG. 8. In addition to the stepped cumulative addition and reduction of fuel through primary pulses, is the high frequency pulsing generated by the ultrasonic generator to introduce a high frequency wave energy to the spray to enhance the atomization of the fuel into small particles to amplify the air gas dynamic scattering when the fuel spray collides with the forced air flow to generate on ignition, a homogeneous thermal field, uniform in temperature with a thorough mixing and dissipation of the products of the combustion process.

Figure 9:
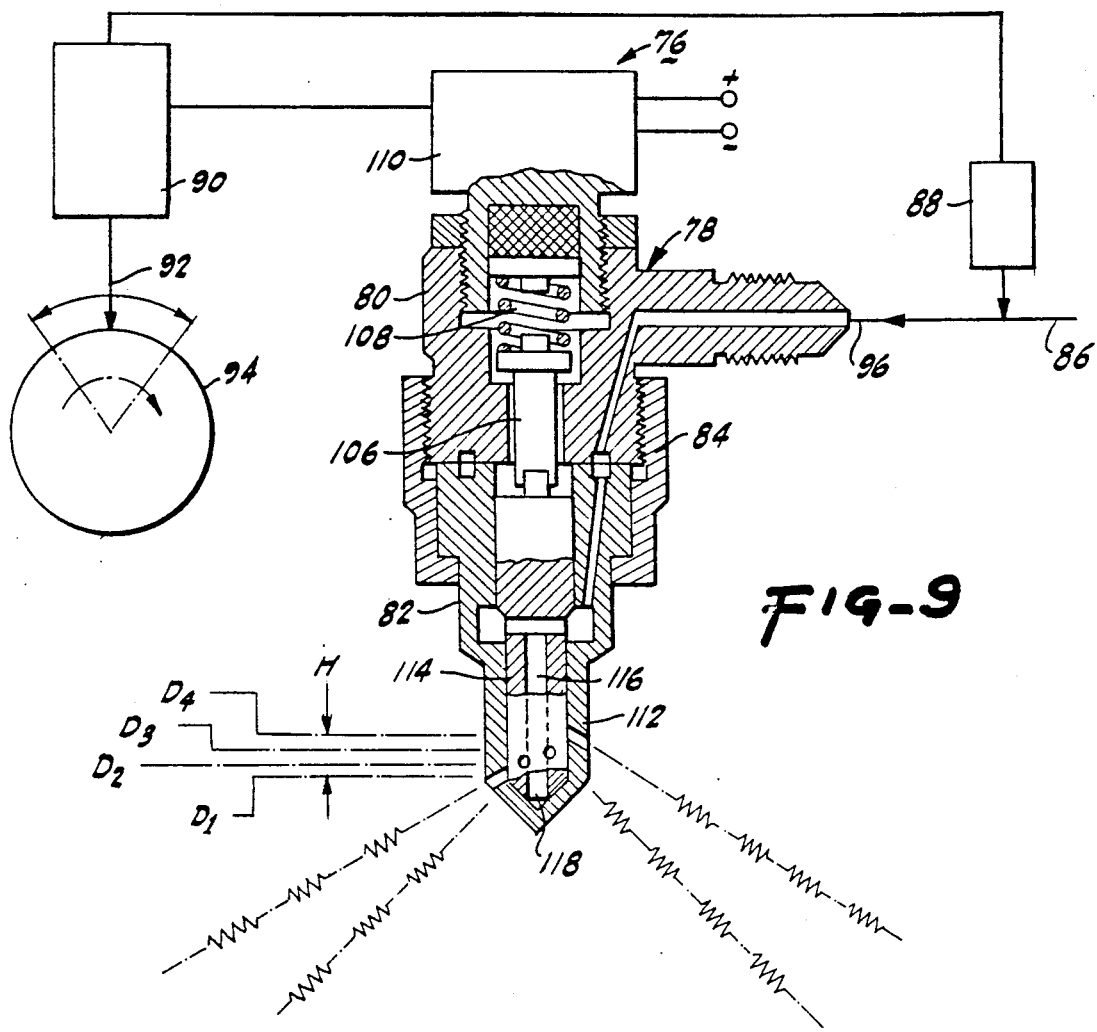
FIG. 9 is a cross sectional view of a second embodiment of a fuel injector with a schematic of the support system for the injector.
Figure 10:
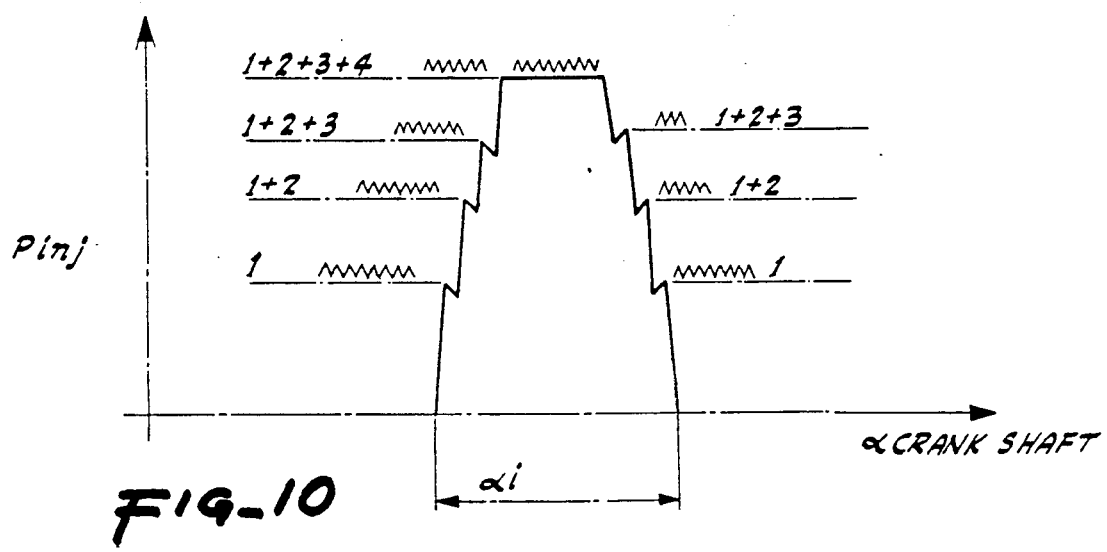
FIG. 10 is a diagrammatic view of the fuel injection process for fuel injector of FIG. 9.

Referring to FIG. 9 and 10 an alternate embodiment of an injector for a fuel injection system is shown. The essential components of the system are identical to that shown for the device of FIG. 7 with changes in the injector tip 112. In the embodiment of FIG. 9, the nozzle tip 112 has a series of staged orifices D1, D2, D3 and D4 in the outer casing of the tip. These form the discharge orifices which are exposed when the needle valve 114 retracts. The needle valve 114 has a central channel 116 that terminates at the end 118 of the valve. As the needle valve rises and successive orifices are exposed, the spray is released through each of the orifices and a cumulative fuel supply pattern is formed as shown diagrammatically in FIG. 10. Similarly, as the needle valve returns to its closed position each of the orifices are effectively closed diminishing the cumulative spray and thus controlling the pattern of fuel injection for most effective combustion. Fuel is injected over the cycle angle.

Coupled with the staged, pulsed injection of fuel is the ultrasonic generator 110 which adds a high frequency pulse to the spray to form finely divided particles of fuel. In operation, the gradual increase in fuel injection through individual jets produces periodic impulses of heat release on ignition and generates successive pulses of combustion products which are thoroughly mixed and dissipated throughout the region of the combustion chamber. Important in this process of sequential injection is the pilot ignition of the first jet spray before the subsequent injections occur to eliminate diesel knock and allow combustion to proceed in a smooth evolution that is adaptable to a multi fuel capability. In the embodiment of FIG. 9 the sequential exposure of nozzles arranged around the tip of the injector create a rotary injection as spray sequentially proceeds around the circumference of the injector tip. In the FIG. 9 embodiment each of the separate orifices can maintain a very small diameter to insure an extremely fine spray which together with the ultrasonic generator allows for a fine particle explosive mixture to be injected into the combustion chamber for instantaneous combustion in lean mixture.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A combustion system for internal combustion engines having a cylinder and at least one piston reciprocal in the cylinder comprising:
   a) A combustion chamber having the regions wherein the piston has a piston head with an outer perimeter portion, a central recessed portion and a baffle with convergent radial slots over eh recessed portion, the piston cooperating with component means for forming an induction region with the outer perimeter portion of the piston, wherein the induction region diminishes in volume when the piston approaches top dead center, forcing gases in the combustion chamber through a central region defined primarily by the slots through the baffle to the dispersing region in the recessed portion of the piston, and,
   b) a fuel injection system with means for injecting fuel into the combustion chamber in a timed sequence initiated immediately prior to the piston reaching top dead center wherein fuel is first injected into the three regions wherein fuel mixes with compressed air and wherein a fuel-air mixture in the induction region is forced from the induction region through the central region to the dispersing region wherein combustion is initiated dispersing combustion gases in a reverse sequence.

2. The combustion system of claim 1 wherein the component means for forming an induction region comprises an oppositely positioned reciprocal piston in the cylinder with a piston head having a complimentary outer perimeter portion that positions proximate the outer perimeter portion of the piston head having the baffle and recessed portion when the pistons are at top dead center.

3. The combustion system of claim 1 wherein the component means for forming an induction region comprises a cylinder head with a complimentary perimeter portion that positions proximate the outer perimeter portion of the piston when the piston is at top dead center.

4. The combustion system of claim 1 wherein the injection means includes at least one fuel injector and a divergent in the piston head of a configuration that initially directs a fuel spray simultaneously to three regions of the combustion chamber when the piston approaches top dead center.

5. The combustion chamber of claim 1 wherein the combustion chamber includes spark ignition means.

6. The combustion chamber of claim 1 wherein the cylinder has an axis and a circumference, and wherein radial to the axis of the cylinder and directing the spray of the second injector into the cylinder tangential to the circumference of the cylinder.

7. The combustion system of claim 1 wherein the baffle comprises a high-temperature inserting the piston head.

8. The combustion system of claim 1 wherein the fuel injection system has two fuel injectors timed for sequential injection.

9. The combustion system of claim 1 wherein the fuel injection system includes a fuel injector having means for generating a series of staged fuel injection pulses during the ignition portion of each cycle.

10. The combustion system of claim 9 wherein the staged fuel injection pulses cumulatively add additional fuel on each pulsed stage of fuel increase and diminish fuel on each pulsed stage of fuel decrease.

11. The combustion system of claim 10 wherein the fuel injection system has a fuel injector with a displaceable needle valve with a series of fuel discharge orifices exposed sequentially on displacement of the needle valve.

12. The combustion system of claim 9 comprising further an ultrasonic generator coupled to the fuel injector to generate an ultrasonic pulse to injected fuel for enhanced dispersion of fuel particles.

13. A combustion system for internal combustion system having a cylinder and at least one piston reciprocal in the cylinder comprising:
   a) a combustion chamber having three regions wherein the piston has a piston head with an outer perimeter portion, a central recessed portion and a baffle with radial slots over the recessed portion, the piston cooperating with component means for forming an induction region diminishes in volume when the piston approaches top dead center, forcing gases in the combustion chamber through a central region defined primarily by the radial slots through the baffle to the dispersing region in the recess portion of the piston, wherein the slots in the baffle are arranged in a star pattern with an open center, and,
   b) a fuel injection for injecting fuel into the combustion chamber.

14. The combustion system of claim 13 wherein the ports in the baffle have a face sloped to the axis of the cylinder to form a swirl of gases entering the dispersion region from the induction region through the central region.

15. The combustion system of claim 14 wherein the component means for forming an induction region comprises an oppositely positioned, reciprocal piston in the cylinder with a piston head having a complimentary outer perimeter portion that positions on proximate the outer perimeter portion of the piston head having the baffle and recessed portion, wherein the baffle is raised centrally over the recess portion with the opposed piston having a central recess to accommodate the raised baffle when the pistons are at top dead center.

16. A combustion system for internal combustion engines having a cylinder and at least one piston reciprocal in the cylinder comprising:
   a combustion chamber and a fuel injection system having a high pressure duel supply and a fuel injector arranged with the cylinder to inject fuel into the combustion chamber, the fuel injector having means for injecting fuel into the combustion chamber in staged cumulative pulses wherein the injection means comprises an injector with an internal needle valve and a plurality of fuel passages sequentially exposed on displacement of the needle valve, wherein the housing has a tip with at least one discharge orifice and fuel is directed from the fuel supply through the fuel passages and to the discharge orifice on displacement of the needle valve wherein the staged fuel injection pulses cumulatively add additional fuel on each pulsed stage of fuel increase and diminish fuel on each pulsed stage of fuel decrease.

17. The combustion system of claim 16 wherein the needle valve has associated spring means for returning the valve and successively closing the passages.

18. The combustion system of claim 17 wherein the injection system includes a fuel injector with a plurality of discharge orifices.

19. The combustion system of claim 18 wherein the fuel injector has a cylindrical nozzle tip and the discharge orifices are spaced around the nozzle tip.

20. The combustion system of claim 17 wherein the injector includes a needle valve and a high pressure fuel supply and the needle valve successively connects the fuel supply to the discharge orifices on displacement of the needle valve, and the fuel injector has a cylindrical nozzle tip.

* * * * *